Aug. 30, 1932.  E. C. NEWCOMB  1,874,585
INTERNAL COMBUSTION ENGINE
Filed Aug. 18, 1927
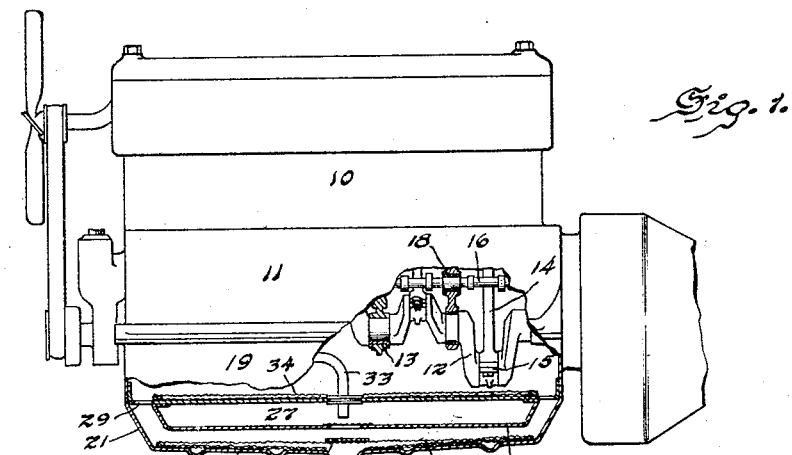
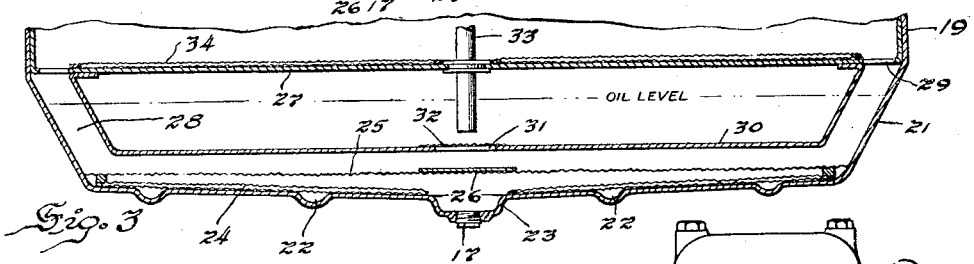
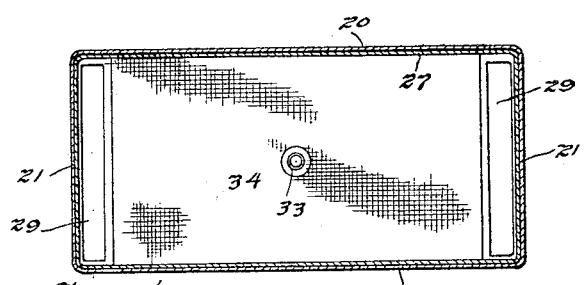
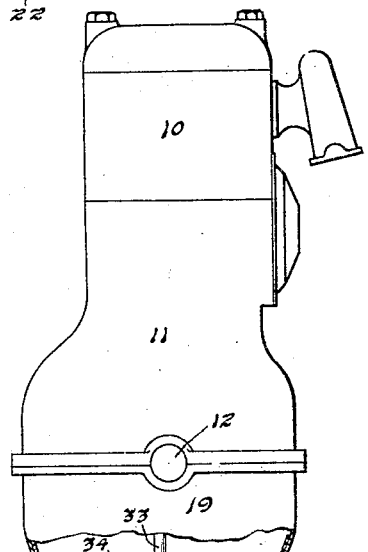
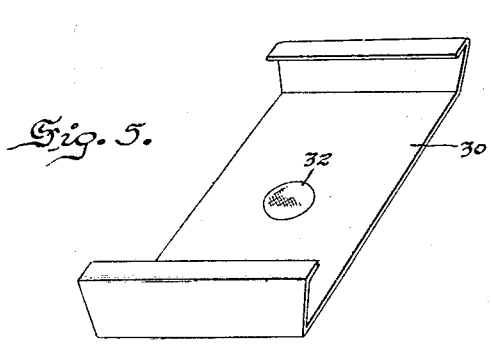
INVENTOR.
Edward C. Newcomb
BY
ATTORNEYS.

Patented Aug. 30, 1932

1,874,585

UNITED STATES PATENT OFFICE

EDWARD C. NEWCOMB, OF SOUTH BEND, INDIANA, ASSIGNOR TO THE STUDEBAKER CORPORATION, OF SOUTH BEND, INDIANA, A CORPORATION OF NEW JERSEY

INTERNAL COMBUSTION ENGINE

Application filed August 18, 1927. Serial No. 213,821.

This invention relates to internal combustion engines, and particularly to the lubrication of the same.

In internal combustion engines the lubricating oil is usually drawn from the crank case reservoir by a pressure pump and is circulated through distributing passageways to the bearings and other working parts. After being used, the oil drains down to the splash tray and is directed into the oil reservoir and passes through a strainer before being picked up by the distributing pump.

Dust and grit drawn into the crank case through the breather tube and small metallic particles from the bearing surfaces mix with the oil as it is being circulated. A considerable amount of this sediment is too fine to be removed by the strainer screen and consequently flows with the oil to the various bearings where it increases the tendency of the same to wear. In some instances, the sediment accumulates in the distributing pipes and restricts the flow of oil, resulting in inadequate lubrication which causes burned out bearings and the like. Some of the sediment works up between the pistons and cylinder walls and scores the contacting surfaces.

It is, therefore, the principal object of this invention to provide an internal combustion engine with an oil reservoir having a new and novel means for trapping the sediment in the lubricating oil.

Another object is to provide an internal combustion engine with a plurality of mesh screens secured in close proximity to the bottoms of the oil pan and oil splash tray for trapping the sediment in the lubricating oil not removed by the oil strainer.

Another object is to provide an internal combustion engine with a plurality of mesh screens secured to the bottom of the oil splash tray, a plurality of mesh screens secured to the bottom of the oil reservoir and a wire mesh baffle positioned above and spaced from the last-mentioned layer of screen, the mesh screens trapping the sediment particles precipitated from the lubricating oil as it flows thereover.

A further object is to provide an internal combustion engine with a crank case oil pan comprising an outer pan, an oil splash tray positioned in and above the bottom of the outer pan to provide an oil reservoir therebetween and an oil baffle tray positioned in the reservoir, the bottom of the baffle tray having a strainer screen directly below the suction end of the oil pump pipe, and the bottoms of the oil tray and outer pan being covered with a plurality of mesh screens to trap the sediment in the lubricating oil flowing thereover to prevent the sediment from entering the oil suction pipe and flowing to the working parts of the engine.

These being among the objects of the present invention, the same consists of certain features of construction and combinations of parts to be hereinafter described with reference to the accompanying drawing and then claimed, having the above and other objects in view.

In the accompanying drawing which illustrates a suitable embodiment of the present invention, Figure 1 is a side view of an internal combustion engine having a portion of the crank case broken away to show the sediment traps in the oil pan.

Figure 2 is an end view of the engine having a portion of the crank case broken away to show the cross section of the oil pan.

Figure 3 is an enlarged longitudinal section taken through the crank case to more clearly show the sediment traps in the oil pan.

Figure 4 is a plan view of the oil pan.

Figure 5 is a perspective view of the oil baffle tray.

Referring to the accompanying drawing, in which like numerals refer to like parts throughout the several views, the internal combustion engine is of the conventional type having a cylinder block 10, a crank case 11, a crank shaft 12 mounted in bearings 13, connecting rods 14 journaled on the crank pins 15, and a cam shaft 16 having bearings 18.

The crank case 11 is provided with an oil pan 19 having inclined side and end walls 20 and 21, respectively, as shown in Figures 2 and 3, and a bottom provided with a number of shallow depressions 22 and a central depression 23 into which a drain plug 17 is threaded. The entire surface of the bottom of the oil pan 19 is covered with several layers of mesh screen 24 as shown in Figures 2 and 3. Spaced above these layers of screen 24 is a wire mesh baffle 25 which has a baffle plate 26 secured thereto in a position directly over the depression 23 for a purpose which will be described later.

Received in and secured to the edges of the open side of the oil pan 19, is an oil splash tray 27 having its bottom spaced above the bottom of the oil pan 19 to provide an oil reservoir 28. The splash tray 27 is formed with rectangular slots 29 at its ends through which oil may flow into the reservoir 28. A baffle tray 30 as shown in Figures 2, 3 and 5 is positioned in the oil reservoir 28 with its sides engaging the side walls 20 of the oil pan 19 and its ends bent upwardly and secured to the splash tray 27 so as to be parallel to and spaced from the end walls 21 of the oil pan 19. An opening 31 is cut in the baffle tray 30 directly above the baffle plate 26 and is covered with a screen 32. The screen 32 is positioned below the suction end of an oil pipe 33 which extends upwardly through the splash tray 27 and leads directly to the oil pump (not shown). The bottom of the splash tray 27 with the exception of the slots 29, is covered as shown in Figures 3 and 4, with a plurality of layers of mesh screen 34 similar to the screen 24 secured to the bottom of the oil pan 19.

The oil, in making its circuit through the engine, is drawn from the reservoir 28 by an oil pump through the suction pipe 33, and is circulated through distributing passageways to the main bearings 13 for the crank shaft 12, the bearings 15 for the connecting rods 14 and to the bearings 18 for the cam shaft 16. The oil not used by the various bearings drains to the splash tray 27 and slowly flows along the bottom thereof to the slots 29 where it enters the oil reservoir 28 through the space between the ends of the baffle tray 30 and the end walls 21 of the oil pan 19. The oil flows downwardly and then horizontally through the space between the bottoms of the baffle tray 30 and oil pan 19, and finally passes upwardly through the strainer screen 32 to the chamber provided by the baffle tray 30.

The oil flows slowly in making this circuit and the sediment particles therein, consequently precipitate out so that when the oil passes over the bottom of the splash tray 27, the heavier particles become entangled in the layers of mesh screen 34 and are prevented from circulating with the oil. The oil in the reservoir does not flow as fast as the oil passing over the splash tray 27 and consequently the lighter sediment particles not picked up by the screen 34 have a longer time to precipitate and are picked up and trapped by the layers of mesh screen 24 covering the bottom of the oil pan 19. Sediment particles which are not trapped by either of the layers of screen 24 or 34 are removed by the strainer screen 32 as the oil passes into the chamber formed by the baffle tray 30. The oil in this chamber is free from all sediment and is ready to be drawn into the suction pipe for re-circulation through the engine. The strainer wire mesh baffle 25 positioned above the layers of screen 24, and the bottom of the baffle tray 30 prevent undue movements of the oil so that the sediment trapped by the layers of screen 24 and lying in the sediment pockets 22, will not be agitated. The baffle plate 26 prevents any sediment which might accumulate in the drain depression 23 from being sucked up by the suction pipe 33 and circulated with the oil.

From the foregoing description, it is apparent that the present invention provides a very satisfactory means for straining the oil and removing from the same all sediment particles which, if not removed, would be injurious to the engine bearings and cylinder walls.

Formal changes may be made in the specific embodiment of the invention described, without departing from the spirit and substance of the broad invention, the scope of which is commensurate with the appended claims.

What I claim is:

1. In a lubricating system for an internal combustion engine, an oil pan providing a reservoir for holding lubricating oil, a plurality of mesh screens lying on and covering the bottom of said oil pan, and spaced sediment pockets formed in the bottom of said oil pan, said plurality of screens and pockets trapping the sediment particles precipitated by the oil in said reservoir.

2. In combination with a lubricating system for an internal combustion engine having an oil pan and a splash tray dividing said oil pan into a crank case portion and an oil reservoir portion, said tray having openings only at the ends thereof for admitting oil to said reservoir so that the oil is required to flow longitudinally of said engine before entering said reservoir, a plurality of mesh screens covering the top of said splash tray to trap foreign particles in the oil flowing from said crank case portion into said reservoir, and a plurality of mesh screens lying on and covering the bottom of said oil pan for trapping foreign particles precipitated from the oil in said reservoir.

3. In an internal combustion engine having lubricating means, an oil pan therefor comprising an oil reservoir, an oil splash tray covering said reservoir having openings only at the ends thereof for admitting oil to said reservoir, an oil baffle tray spaced above the bottom of said oil reservoir to prevent agitation of the oil in said reservoir, said baffle tray having its sides engaging the sides of said oil pan and its ends bent upwardly and secured to the under surface of said splash tray to provide a chamber below said splash tray and above the bottom of said reservoir, and a screened opening in said baffle tray for straining the oil entering said chamber from said reservoir.

4. In an internal combustion engine having lubricating means, an oil pan, a splash tray dividing said oil pan into a crank case portion and an oil reservoir portion, openings at the ends only of said splash tray for admitting oil to said reservoir, an oil baffle tray spaced above the bottom of said oil pan and having its ends secured to said oil tray in spaced relationship to the ends of said oil pan and having the marginal edges of its sides engaging the sides of said oil pan to provide a reservoir above the bottom of said oil pan and below said splash tray, and a screened opening in said baffle tray, said lubricating oil draining through said splash tray into said reservoir through the spaces between the ends of said baffle tray and said oil pan and into said chamber through said screened opening.

5. In an internal combustion engine having lubricating means, an oil pan, a splash tray dividing said oil pan into a crank case portion and an oil reservoir portion, said tray having openings leading to said reservoir portion, a baffle tray engaging the sides of said oil pan and spaced from the bottom thereof to provide an oil chamber, a screened opening in said baffle tray to strain the oil passing from said reservoir to said chamber, a plurality of mesh screens secured to the bottom of said reservoir and a wire mesh baffle extending the length of said reservoir spaced between said baffle tray and said mesh screens, said mesh screens trapping foreign particles precipitated from said oil before its passage into said chamber, and said wire mesh baffle above said mesh screens eliminating agitation of the oil in said reservoir thereby to prevent the foreign particles trapped by said mesh screens from mixing with said oil.

Signed by me at South Bend, Indiana, this 16th day of August, 1927.

EDWARD C. NEWCOMB.